United States Patent
Karlsson

(10) Patent No.: US 7,979,557 B2
(45) Date of Patent: Jul. 12, 2011

(54) FAST SETUP RESPONSE PREDICTION

(75) Inventor: Kent Karlsson, San Francisco, CA (US)

(73) Assignee: Mobitv, Inc., Emeryville, CA (US)

( * ) Notice: Subject to any disclaimer, the term of this patent is extended or adjusted under 35 U.S.C. 154(b) by 274 days.

(21) Appl. No.: 12/101,893

(22) Filed: Apr. 11, 2008

(65) Prior Publication Data

US 2009/0259763 A1    Oct. 15, 2009

(51) Int. Cl.
    *G06F 15/16* (2006.01)
(52) U.S. Cl. ...................................................... 709/227
(58) Field of Classification Search ........... 709/227–229
    See application file for complete search history.

(56) References Cited

U.S. PATENT DOCUMENTS

| | | | |
|---|---|---|---|
| 6,144,961 A * | 11/2000 | de la Salle | 1/1 |
| 2002/0073205 A1 * | 6/2002 | Mostafa | 709/227 |
| 2003/0131353 A1 * | 7/2003 | Blom et al. | 725/25 |
| 2004/0098748 A1 * | 5/2004 | Bo et al. | 725/105 |
| 2004/0184432 A1 * | 9/2004 | Gateva et al. | 370/349 |
| 2006/0206617 A1 * | 9/2006 | Rey et al. | 709/231 |
| 2006/0259949 A1 * | 11/2006 | Schaefer et al. | 726/1 |
| 2007/0058626 A1 * | 3/2007 | Keller et al. | 370/390 |
| 2007/0266122 A1 * | 11/2007 | Einarsson et al. | 709/220 |
| 2007/0297339 A1 * | 12/2007 | Taylor et al. | 370/248 |
| 2008/0191816 A1 * | 8/2008 | Balachandran et al. | 333/24 R |
| 2008/0228912 A1 * | 9/2008 | Vedantham et al. | 709/224 |
| 2009/0254667 A1 * | 10/2009 | Li et al. | 709/228 |
| 2009/0259762 A1 * | 10/2009 | Karlsson et al. | 709/231 |

OTHER PUBLICATIONS

Lee, J. et al., Proxy-based Multimedia Singaling Scheme using RTSP for Seamless Service Mobility in Home Network, Feb. 18, 2008, IEEE, IEEE Transactions on Consumer Electronics, vol. 54, Issue: 2, pp. 481-486.*

H. Schulzrinne, A. Rao and R. Lanphier, "Real Time Streaming Protocol (RTSP)," Network Working Group, Request for Comments: 2326, Apr. 1998, 86 pages.

* cited by examiner

*Primary Examiner* — Wing F Chan
*Assistant Examiner* — Alicia Baturay
(74) *Attorney, Agent, or Firm* — Weaver Austin Villeneuve & Sampson LLP

(57) ABSTRACT

Mechanisms are provided to accelerate Real-Time Streaming Protocol (RTSP) setup messages. A client transmits an RTSP request to a server. The server responds to the request and preemptively responds with acknowledgements for messages not yet received. For example, a server responds to an RTSP describe message with an RTSP describe acknowledgement, an RTSP setup acknowledgement, and an RTSP play response before setup and play messages are received by the server or even transmitted by the client. The client processes the anticipatory responses and transmits setup and play responses when the anticipatory responses are processed.

20 Claims, 6 Drawing Sheets

| RTP Packet Stream 301 | | | | | | | | | | | | | | | | |
|---|---|---|---|---|---|---|---|---|---|---|---|---|---|---|---|---|
| Timestamp 303 | 6 | 6 | 6 | 7 | 8 | 9 | 10 | 11 | 11 | 12 | 13 | 14 | 15 | 16 | 17 | 17 |
| Sequence Number 305 | 4303 | 4304 | 4305 | 4306 | 4307 | 4308 | 4309 | 4310 | 4311 | 4312 | 4313 | 4314 | 4315 | 4316 | 4317 | 4318 |
| Marker 307 | 0 | 0 | 0 | 0 | 0 | 0 | 0 | 0 | 0 | 0 | 0 | 0 | 0 | 0 | 0 | 0 |
| Data Frame 309 | I | I | I | P | B | P | P | I | I | P | P | B | P | B | I | I |

FAST SETUP RESPONSE PREDICTION

TECHNICAL FIELD

The present disclosure relates to accelerating setup requests for media streams.

DESCRIPTION OF RELATED ART

Protocols such as the Real-Time Transport Protocol (RTP) are used to transport video and audio data over networks. A separate session is used to carry each content stream such as a video or audio stream. RTP specifies a standard packet format that is used to carry video and audio data such as Moving Pictures Expert Group (MPEG) video data including MPEG-2 and MPEG-4 video frames. In many instances, multiple frames are included in a single RTP packet. The MPEG frames themselves may be reference frames or may be frames encoded relative to a reference frame. Protocols such as the Real-Time Streaming Protocol (RTSP) are used to perform session management operations to allow delivery of media using RTP. RTSP supports multiple data delivery sessions and provides a technique for selecting an appropriate delivery mechanism.

Conventional techniques and mechanisms using protocols like RTSP to establish sessions are inefficient. Consequently, it is desirable to provide techniques and mechanisms for establishing and managing sessions using protocols like RTSP.

BRIEF DESCRIPTION OF THE DRAWINGS

The disclosure may best be understood by reference to the following description taken in conjunction with the accompanying drawings, which illustrate particular embodiments.

FIG. 3 illustrates one example of an RTP stream.

DESCRIPTION OF EXAMPLE EMBODIMENTS

Figure 1:
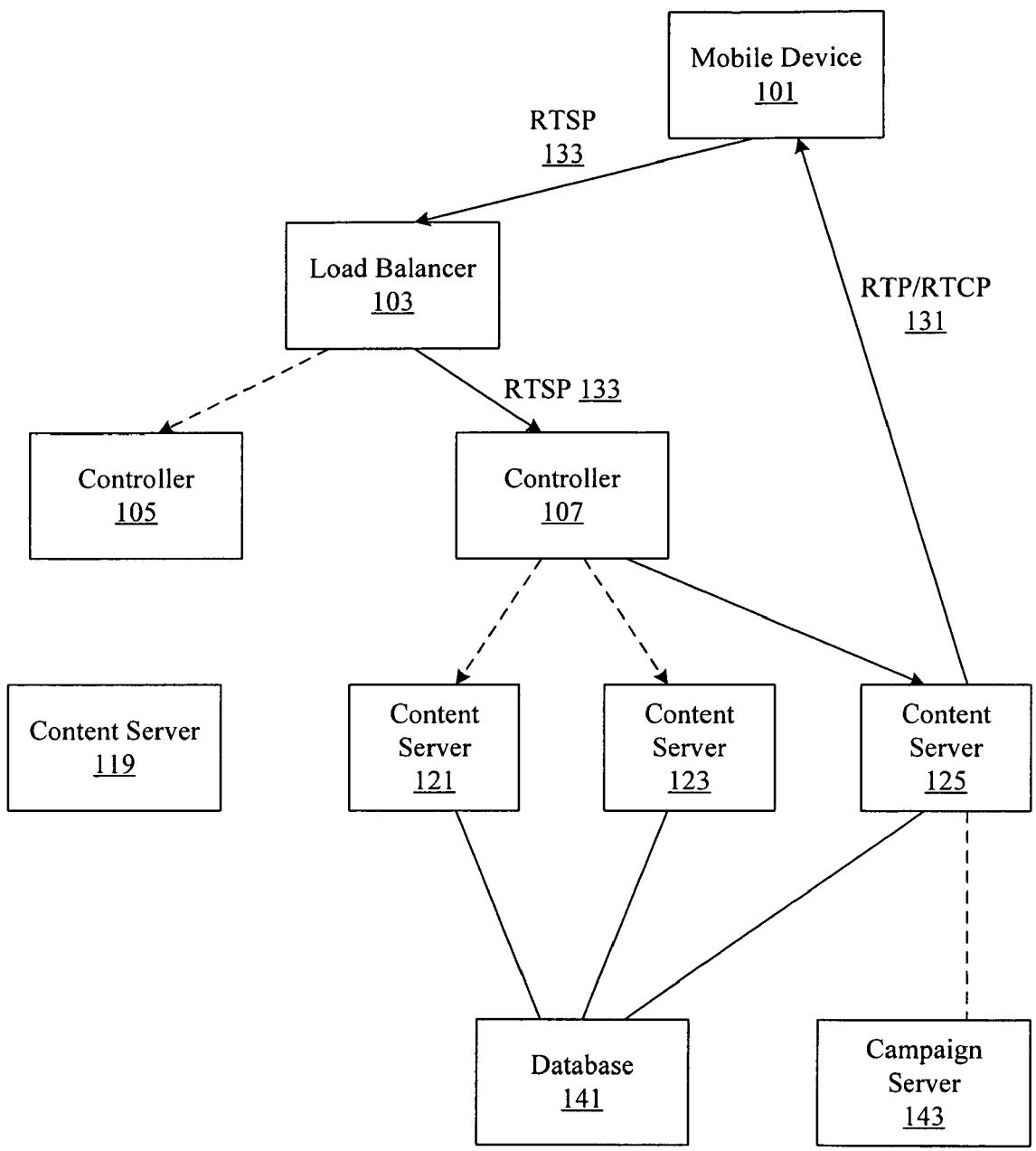
FIG. 1 illustrates an exemplary system for use with embodiments of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of the Real-Time Transport Protocol (RTP) and the Real-Time Streaming Protocol (RTSP). However, it should be noted that the techniques of the present invention apply to variations of RTP and RTSP. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors can while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided to accelerate Real-Time Streaming Protocol (RTSP) setup messages. A client transmits an RTSP request to a server. The server responds to the request and preemptively responds with acknowledgements for messages not yet received. For example, a server responds to an RTSP describe message with an RTSP describe acknowledgement, an RTSP setup acknowledgement, and an RTSP play response before setup and play messages are received by the server or even transmitted by the client. The client processes the anticipatory responses and transmits setup and play responses when the anticipatory responses are processed.

Example Embodiments

A variety of mechanisms are used to deliver media streams to devices. In particular examples, a client establishes a session such as a Real-Time Streaming Protocol (RTSP) session. A server computer receives a connection for a media stream, establishes a session, and provides a media stream to a client device. In order to establish a session using RTSP, multiple commands are needed for a video and audio stream. Each command from a client requires an acknowledgement from a server. Clients are configured to receive specific responses before proceeding with a subsequent command or request to the server. If multiple responses are received, the commands are proceed typically in first in, first out (FIFO) order. In some instances, having a multiple command exchange occur may not be a problem. However, in other instances, a network may introduce excess latency in establishing a session even before any media stream is provided.

Consequently, the techniques of the present invention allow a server to predict requests and commands from a client and preemptively send responses even before the requests and commands are received. In some examples, responses to a complete setup exchange are transmitted after a single command is received from a client. By predicting and preemptively sending responses, round trip times for all of the request and response sequences can be reduced. In particular instances, session establishment time can be reduced by 3-4 seconds.

After a session is established, a media stream is transmitted to the client using RTP. The media stream includes packets encapsulating frames such as Moving Pictures Expert Group (MPEG) frames. The MPEG frames themselves may be key frames or differential frames. The specific encapsulation methodology used by the server depends on the type of content, the format of that content, the format of the payload, the application and transmission protocols being used to send the data. After the client device receives the media stream, the client device decapsulates the packets to obtain the MPEG frames and decodes the MPEG frames to obtain the actual media data.

In many instances, a server computer obtains media data from a variety of sources, such as media libraries, cable providers, satellite providers, and processes the media data into MPEG frames such as MPEG-2 or MPEG-4 frames. In particular examples, encoding video and audio into MPEG formatted frames is a resource intensive task. Consequently, server computers will often encode only a limited number of streams for a particular channel. In particular examples, a server computer may encode six media streams of varying bit rates for a particular channel for distribution to a variety of disparate devices. However, thousands of different users may be viewing a particular channel. In many instances, it is desirable to provide a more customized and individualized viewing experience for users.

Some conventional systems allow a user with a particular client to select a media stream for viewing or listening. Instead of providing the requested media stream, a content server can send an advertisement stream to the user before sending the requested media stream. The advertisement stream is limited in scope as it can only be inserted at the beginning of a media stream. This advertising stream first feature requires a client to have an application supporting the specific feature. The client application is also required to restart buffering or even restart a session before playing the requested media stream. It is contemplated that an advertising stream can also be provided at the end of a media stream. However, the same limitations apply, as the client application has to support the particular feature set and is also required to restart buffering or even restart a session to play the advertising stream.

FIG. 1 is a diagrammatic representation illustrating one example of a system that can use the techniques and mechanisms of the present invention. According to various embodiments, content servers 119, 121, 123, and 125 are configured to provide media content to a mobile device 101 using protocols such as RTP and the Real-time Control Protocol (RTCP). Although a mobile device 101 is shown, it should be recognized that other devices such as set top boxes and computer systems can also be used. In particular examples, the content servers 119, 121, 123, and 125 can themselves establish sessions with mobile devices and stream video and audio content to mobile devices. However, it is recognized that in many instances, a separate controller such as controller 105 or controller 107 can be used to perform session management using a protocol such as RTSP. It is recognized that content servers require the bulk of the processing power and resources used to provide media content mobile devices. Session management itself may include far fewer transactions. Optimizations can also be implemented to allow session management to proceed efficiently and effectively. Consequently, a controller can handle a far larger number of mobile devices than a content server can. In some examples, a content server can operate simultaneously with thousands of mobile devices, while a controller performing session management can manage millions of mobile devices simultaneously.

By separating out content streaming and session management functions, a controller can select a content server geographically close to a mobile device 101. It is also easier to scale, as content servers and controllers can simply be added as needed without disrupting system operation. A load balancer 103 can provide further efficiency during session management using RTSP 133 by selecting a controller with low latency and high throughput.

According to various embodiments, the content servers 119, 121, 123, and 125 have access to a campaign server 143. The campaign server 143 provides profile information for various mobile devices 101. In some examples, the campaign server 143 is itself a content server or a controller. The campaign server 143 can receive information from external sources about devices such as mobile device 101. The information can be profile information associated with various users of the mobile device including interests and background. The campaign server 143 can also monitor the activity of various devices to gather information about the devices. The content servers 119, 121, 123, and 125 can obtain information about the various devices from the campaign server 143. In particular examples, a content server 125 uses the campaign server 143 to determine what type of media clips a user on a mobile device 101 would be interested in viewing.

According to various embodiments, the content servers 119, 121, 123, and 125 are also receiving media streams from content providers such as satellite providers or cable providers and sending the streams to devices using RTP 131. In particular examples, content servers 119, 121, 123, and 125 access database 141 to obtain desired content that can be used to supplement streams from satellite and cable providers. In one example, a mobile device 101 requests a particular stream. A controller 107 establishes a session with the mobile device 101 and the content server 125 begins streaming the content to the mobile device 101 using RTP 131. In particular examples, the content server 125 obtains profile information from campaign server 143.

In some examples, the content server 125 can also obtain profile information from other sources, such as from the mobile device 101 itself. Using the profile information, the content server can select a clip from a database 141 to provide to a user. In some instances, the clip is injected into a live stream without affecting mobile device application performance. In other instances, the live stream itself is replaced with another live stream. The content server handles processing to make the transition between streams and clips seamless from the point of view of a mobile device application. In still other examples, advertisements from a database 141 can be intelligently selected from a database 141 using profile information from a campaign server 143 and used to seamlessly replace default advertisements in a live stream. Content servers 119, 121, 123, and 125 have the capability to manipulate RTP packets to allow introduction and removal of media content.

Figure 2:
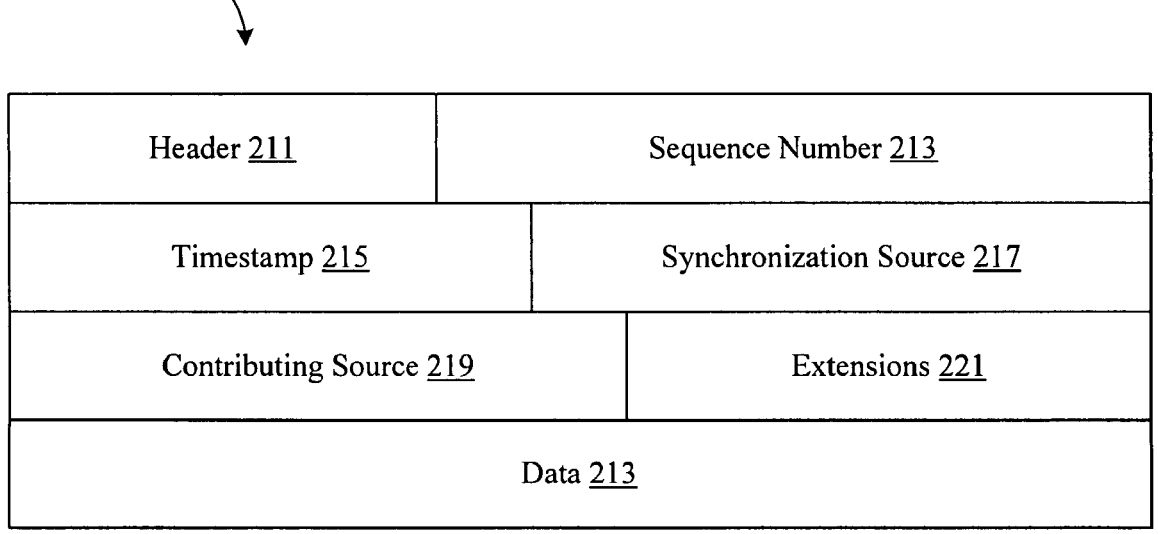
FIG. 2 illustrates one example of a Real-Time Transport Protocol (RTP) packet.

FIG. 2 illustrates one example of an RTP packet. An RTP packet 201 includes a header 211. According to various embodiments, the header 211 includes information such as the version number, amount of padding, protocol extensions, application level, payload format, etc. The RTP packet 201 also includes a sequence number 213. Client applications receiving RTP packets expect that the sequence numbers for received packets be unique. If different packets have the same sequence number, erroneous operation can occur. RTP packets also have a timestamp 215 that allows jitter and synchronization calculations. Fields 217 and 219 identify the synchronization source and the contributing source. Extensions are provided in field 221.

According to various embodiments, data 231 holds actual media data such as MPEG frames. In some examples, a single RTP packet 201 holds a single MPEG frame. In many instances, many RTP packets are required to hold a single MPEG frame. In instances where multiple RTP packets are required for a single MPEG frame, the sequence numbers change across RTP packets while the timestamp 215 remains the same across the different RTP packets. Different MPEG frames include I-frames, P-frames, and B-frames. I-frames are intraframes coded completely by itself. P-frames are predicted frames which require information from a previous I-frame or P-frame. B-frames are bi-directionally predicted frames that require information from surrounding I-frames and P-frames.

Because different MPEG frames require different numbers of RTP packets for transmission, two different streams of the same time duration may require different numbers of RTP packets for transmission. Simply replacing a clip with another clip would not work, as the clips may have different numbers of RTP packets and having different impacts on the sequence numbers of subsequent packets.

FIG. 3 illustrates one example of an RTP packet stream. An RTP packet stream 301 includes individual packets having a variety of fields and payload data. According to various embodiments, the fields include a timestamp 303, sequence 505, marker 307, etc. The packets also include payload data 309 holding MPEG frames such as I, P, and B-frames. Timestamps for different packets may be the same. In particular examples, several packets carrying portions of the same I-frame have the same time stamp. However, sequence numbers are different for each packet. Marker bits 307 can be used for different purposes, such as signaling the starting point of an advertisement.

According to various embodiments, packets with sequence numbers 4303, 4304, and 4305 carrying potions of the same I-frame and have the same timestamp of 6. Packets with sequence numbers 4306, 4307, 4308, and 4309 carry P, B, P, and P-frames and have timestamps of 7, 8, 9, and 10 respectively. Packets with sequence numbers 4310 and 4311 carry different portions of the same I-frame and both have the same timestamp of 11. Packets with sequence numbers 4312, 4313, 4314, 4315, and 4316 carry P, P, B, P, and B-frames respectively and have timestamps 12, 13, 14, 15, and 16. It should be noted that the timestamps shown in FIG. 3 are merely representational. Actual timestamps can be computed using a variety of mechanisms.

For many audio encodings, the timestamp is incremented by the packetization interval multiplied by the sampling rate. For example, for audio packets having 20 ms of audio sampled at 8,000 Hz, the timestamp for each block of audio increases by 160. The actual sampling rate may also differ slightly from this nominal rate. For many video encodings, the timestamps generated depend on whether the application can determine the frame number. If the application can determine the frame number, the timestamp is governed by the nominal frame rate. Thus, for a 30 f/s video, timestamps would increase by 3,000 for each frame. If a frame is transmitted as several RTP packets, these packets would all bear the same timestamp. If the frame number cannot be determined or if frames are sampled a periodically, as is typically the case for software codecs, the timestamp may be computed from the system clock While the timestamp is used by a receiver to place the incoming media data in the correct timing order and provide playout delay compensation, the sequence numbers are used to detect loss. Sequence numbers increase by one for each RTP packet transmitted, timestamps increase by the time "covered" by a packet. For video formats where a video frame is split across several RTP packets, several packets may have the same timestamp. For example, packets with sequence numbers 4317 and 4318 have the same timestamp 17 and carry portions of the same I-frame.

Figure 4:
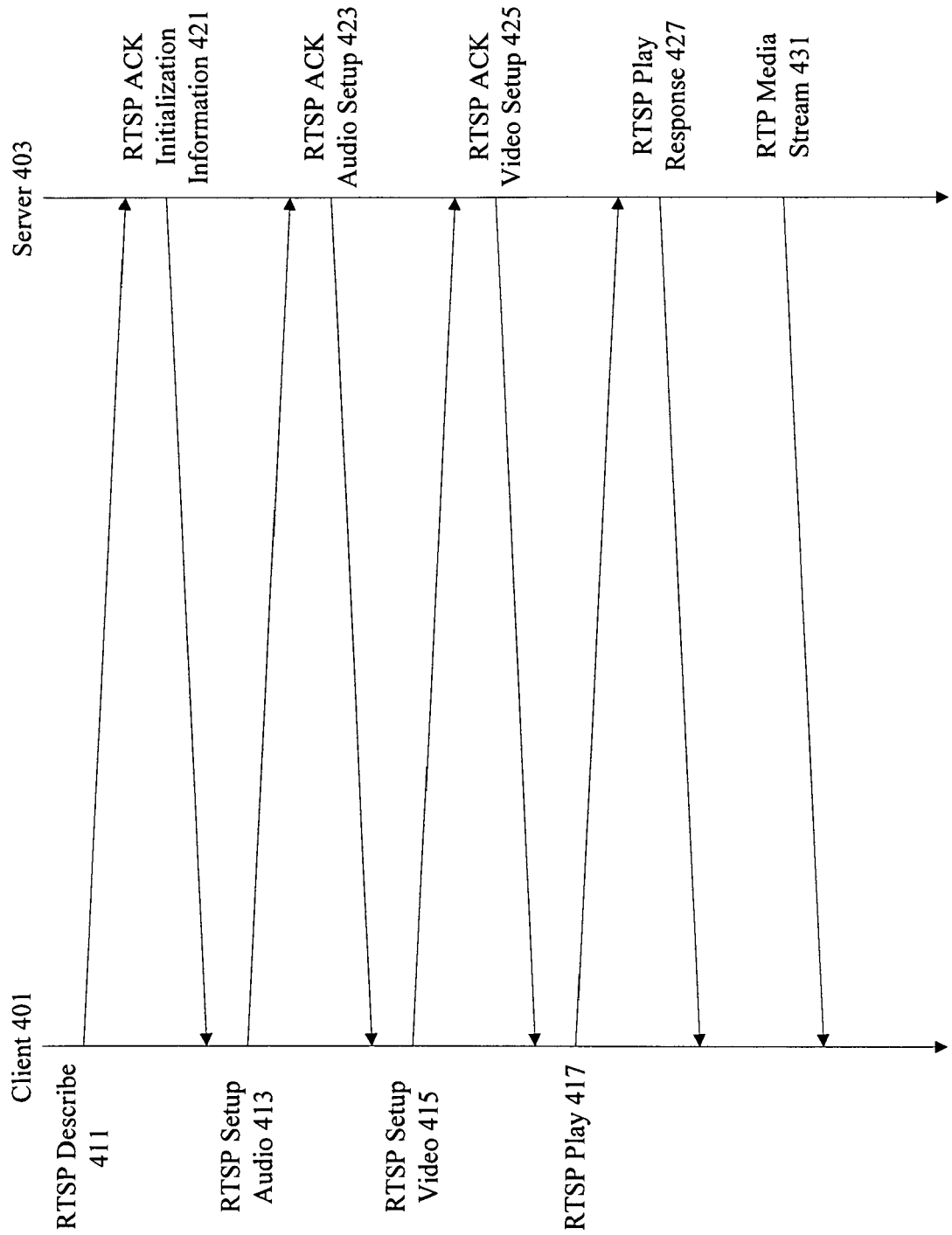
FIG. 4 illustrates one example of a Real-Time Streaming Protocol (RTSP) Exchange.

FIG. 4 illustrates one example of RTSP exchange used to establish are session for delivery of RTP packets. A variety of commands can be used to establish a media session. According to various embodiments, a client 401 sends to server 403 a DESCRIBE message 411. In particular examples, the DESCRIBE message retrieves the description of a presentation or media object identified by the request URL from a server. It may specify the description formats that the client understands. The server responds with a description of the requested resource. The DESCRIBE reply-response pair constitutes the media initialization phase of RTSP. The server 403 responds with an RTSP acknowledgement 421. According to various embodiments, the DESCRIBE response includes all media initialization information for the resource(s) that it describes. If a media client obtains a presentation description from a source other than DESCRIBE and that description contains a complete set of media initialization parameters, the client should use those parameters and not then request a description for the same media via RTSP. After receiving the DESCRIBE response, a client 401 sends to server 403 an RTSP audio SETUP message.

According to various embodiments, the SETUP request for a URI specifies the transport mechanism to be used for the streamed media. A client can issue a SETUP request for a stream that is already playing to change transport parameters, which a server MAY allow. If it does not allow this, it responds with an error. A client indicates the transport parameters even if it has no influence over these parameters, such as when the server advertises a fixed multicast address. Since SETUP includes transport initialization information, firewalls and other intermediate network devices (which need this information) are spared the more arduous task of parsing the DESCRIBE response, which has been reserved for media initialization. The server 403 sends an audio SETUP acknowledgement 423.

The server generates session identifiers in response to SETUP requests. If a SETUP request to a server includes a session identifier, the server bundles this SETUP request into the existing session or returns an error. The client 401 also sends an RTSP video SETUP request 415 to the server 403. The server 403 responds to the client 401 with an acknowledgement 425. According to various embodiments, the client 401 then sends an RTSP PLAY message 417 to the server 403. The PLAY message tells the server to start sending data using the mechanism specific in SETUP. According to various embodiments, a client does not issue a play request until outstanding SETUP requests have been acknowledged as successful. In particular examples, the PLAY request positions the normal play time to the beginning of the range specified and delivers stream data until the end of the range is reached.

The PLAY requests may be pipelined (queued) and a server queues PLAY requests to be executed in order. That is, a PLAY request arriving while a previous PLAY request is still active is delayed until the first has been completed to allow for precise editing. The server 203 responds with an RTSP PLAY Response 427. According to various embodiments, for a on-demand stream, the server replies with the actual range that will be played back. This may differ from the requested range if alignment of the requested range to valid frame boundaries is required for the media source. If no range is specified in the request, the current position is returned in the reply. The unit of the range in the reply is the same as that in the request. According to various embodiments, the server 403 sends an RTP media stream 431 to the client 401. It should be recognized that the RTP media stream 431 may be sent by the server 403 or by an different server entirely. For example, the server 403 may be a controller while a separate content server transmits the RTP media stream 431.

Figure 5:
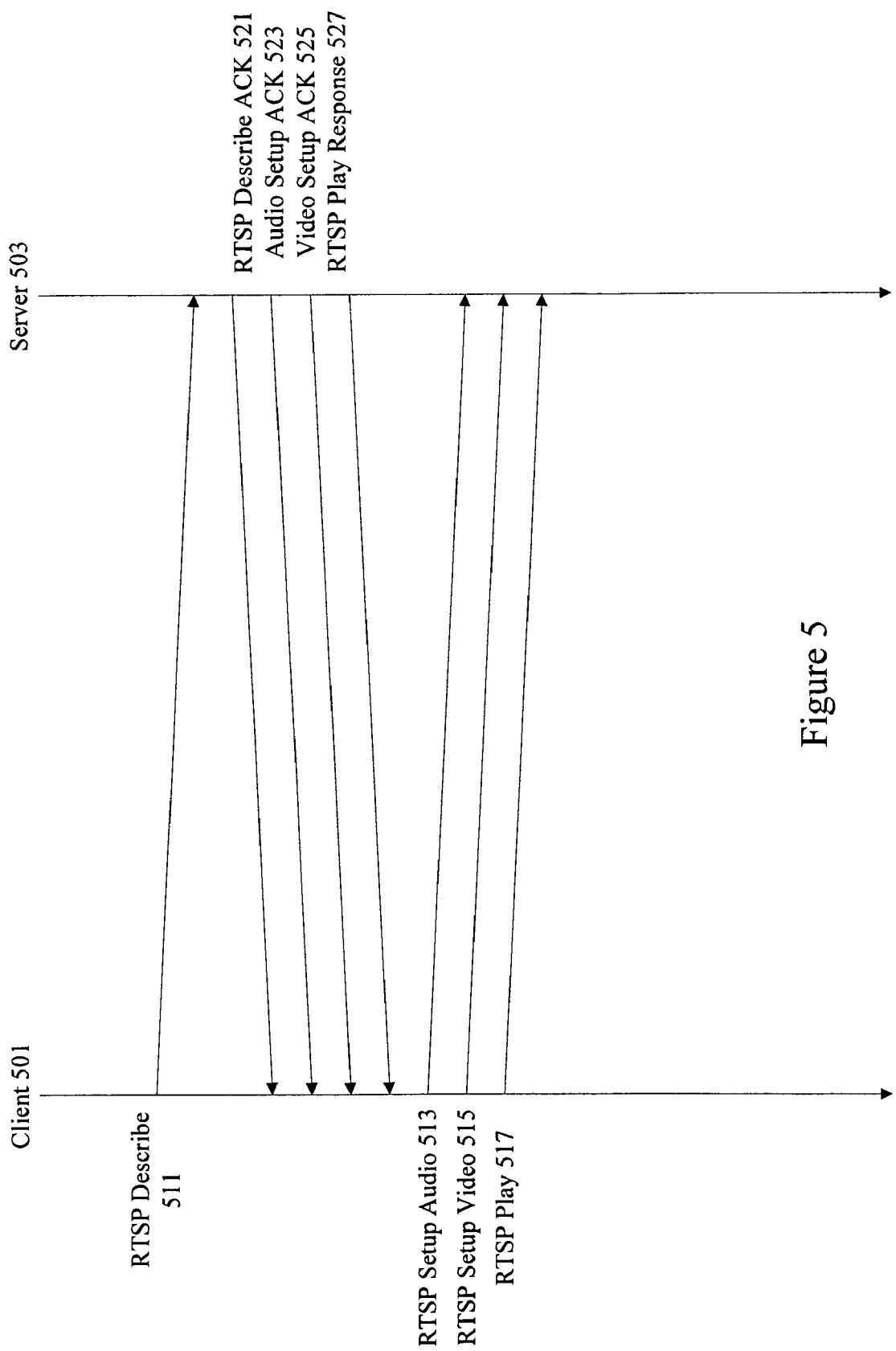
FIG. 5 illustrates another example of a Real-Time Streaming Protocol (RTSP) Exchange.

FIG. 5 illustrates one example of an accelerated RTSP exchange. A variety of commands can be used to establish a media session. It is recognized that establishing a session can entail long delays because of the round trip times resulting from setup and response messages. Consequently, the techniques of the present invention intelligent predict and anticipate messages in a setup sequence. According to various embodiments, a client 501 sends to server 503 a DESCRIBE message 511. In particular examples, the DESCRIBE message retrieves the description of a presentation or media object identified by the request URL from a server. It may specify the description formats that the client understands. The server responds with a description of the requested resource. The DESCRIBE reply-response pair constitutes the media initialization phase of RTSP.

According to various embodiments, the DESCRIBE response includes all media initialization information for the resource(s) that it describes. If a media client obtains a presentation description from a source other than DESCRIBE and that description contains a complete set of media initialization parameters, the client should use those parameters and not then request a description for the same media via RTSP. According to various embodiments, the server 503 responds with an RTSP acknowledgement 521. The server 503 also anticipates additional setup messages from the client 501 such as audio and video setup messages and play messages and preemptively provides responses before the audio and video setup messages are received. According to various embodiments, the server 503 provides responses with information to allow session establishment by preemptively sending an RTP DESCRIBE acknowledgement 521, an audio SETUP acknowledgement 523, a video SETUP acknowledgement 525, and an RTSP PLAY acknowledgement 527.

The client 501 can transmit RTSP audio SETUP message 513, RTP video SETUP message 515 and RTSP play message 517 when the appropriate response messages from the server 503 are processed at the client 501. In many instances, the RTSP audio SETUP message 513, RTP video SETUP message 515 and RTSP play message 517 are processed in FIFO order at the client 501.

There no longer is a delay due to waiting for the appropriate responses. According to various embodiments, the server generates appropriate anticipatory responses that correspond with the actual messages that will be sent by client 501 before the client messages are received by the server or even generated by the client.

Figure 6:
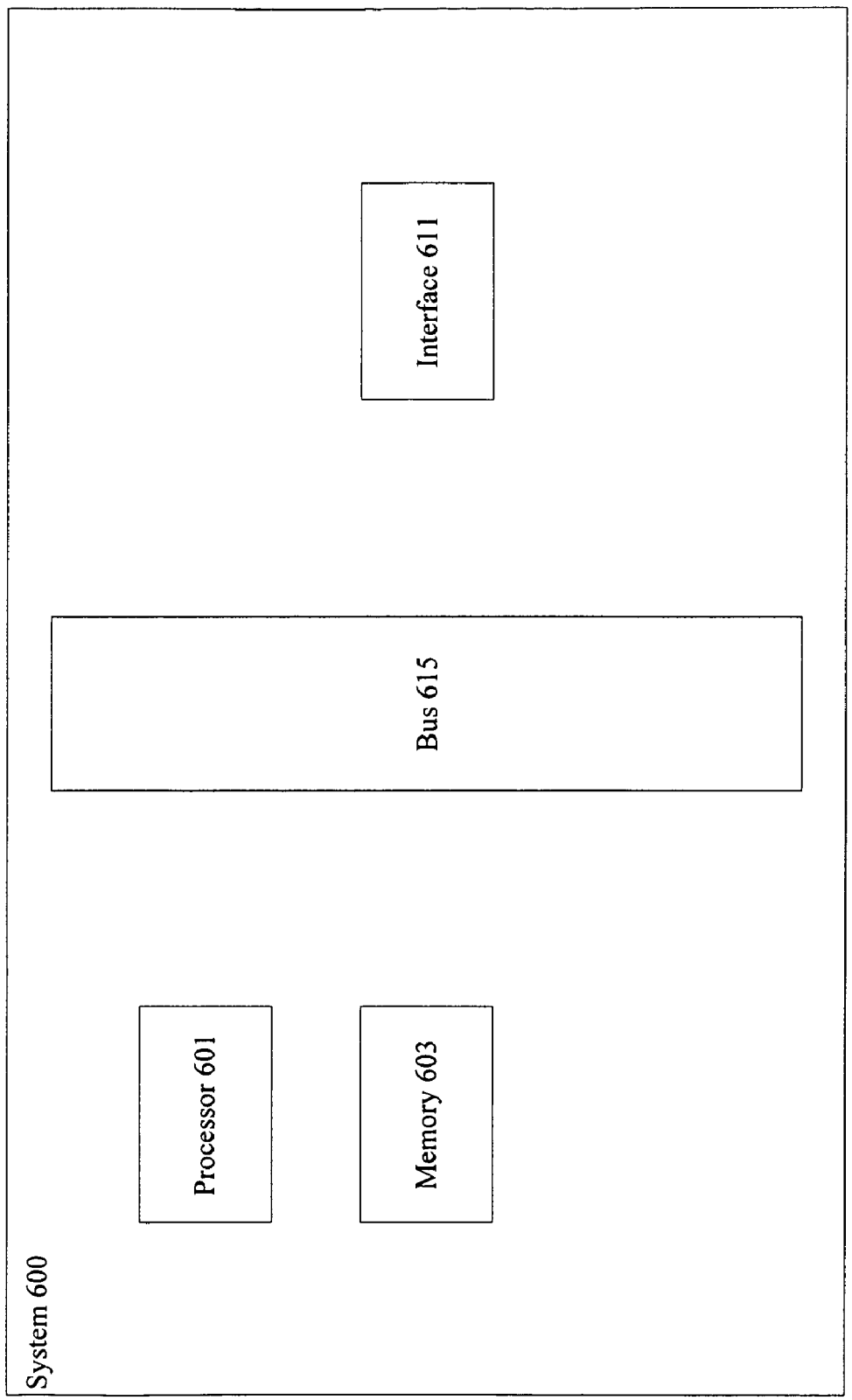
FIG. 6 illustrates one example of a system for processing media streams.

FIG. 6 illustrates one example of a content server that can perform live stream modification. According to particular embodiments, a system 600 suitable for implementing particular embodiments of the present invention includes a processor 601, a memory 603, an interface 611, and a bus 615 (e.g., a PCI bus or other interconnection fabric) and operates as a streaming server. When acting under the control of appropriate software or firmware, the processor 601 is responsible for modifying and transmitting live media data to a client. Various specially configured devices can also be used in place of a processor 601 or in addition to processor 601. The interface 611 is typically configured to end and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 600 is a content server that also includes a transceiver, streaming buffers, an program guide information. The content server may also be associated with subscription management, logging and report generation, and monitoring capabilities. In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the content server 691 handles requests and responses for media content related transactions while a separate streaming server provides the actual media streams.

Although a particular content server 691 is described, it should be recognized that a variety of alternative configurations are possible. For example, some modules such as a report and logging module 653 and a monitor 651 may not be needed on every server. Alternatively, the modules may be implemented on another device connected to the server. In another example, the server 691 may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method, comprising:
   receiving a Real-Time Streaming Protocol (RTSP) describe message at a server, the RTSP describe message initiated by a client device to establish a session to receive a media stream;
   transmitting from the server an RTSP describe acknowledgement, an RTSP setup acknowledgement, and an RTSP play acknowledgement before the corresponding RTSP setup and RTSP play messages are received at the server.

2. The method of claim 1, wherein transmitting the RTSP setup acknowledgment and the RTSP play acknowledgment before the corresponding RTSP setup and RTSP play messages are sent by the client.

3. The method of claim 1, wherein the server is a controller connected to a plurality of content servers.

4. The method of claim 3, wherein the controller is operable to perform session management while the content servers transmit media data to the client device using RTP.

5. The method of claim 1, wherein the client device is a mobile device.

6. The method of claim 1, wherein the RTSP setup acknowledgement includes an RTSP audio setup acknowledgement and an RTSP video setup acknowledgment.

7. The method of claim 1, wherein the media stream is a live stream including a plurality of packets.

8. The method of claim 7, wherein the plurality of packets hold I-frames, P-frames, and B-frames.

9. A system, comprising:
    an interface operable to receive a Real-Time Streaming Protocol (RTSP) describe message at a server, the RTSP describe message initiated by a client device to establish a session to receive a media stream;
    wherein the interface at the server is further operable to transmit an RTSP describe acknowledgement, an RTSP setup acknowledgement, and an RTSP play acknowledgement before the corresponding RTSP setup and RTSP play messages are received at the server.

10. The method of claim 9, wherein transmitting the RTSP setup acknowledgment and the RTSP play acknowledgment before the corresponding RTSP setup and RTSP play messages are sent by the client.

11. The system of claim 9, wherein the server is a controller connected to a plurality of content servers.

12. The system of claim 11, wherein the controller is operable to perform session management while the content servers transmit media data to the client device using RTP.

13. The system of claim 9, wherein the client device is a mobile device.

14. The system of claim 9, wherein the RTSP setup acknowledgement includes an RTSP audio setup acknowledgement and an RTSP video setup acknowledgment.

15. The system of claim 9, wherein the media stream is a live stream including a plurality of packets.

16. The system of claim 15, wherein the plurality of packets hold I-frames, P-frames, and B-frames.

17. An apparatus, comprising:
    means for receiving a Real-Time Streaming Protocol (RTSP) describe message at a server, the RTSP describe message initiated by a client device to establish a session to receive a media stream;
    means for transmitting from the server an RTSP describe acknowledgement, an RTSP setup acknowledgement, and an RTSP play acknowledgement before the corresponding RTSP setup and RTSP play messages are received at the server.

18. The method of claim 17, wherein transmitting the RTSP setup acknowledgment and the RTSP play acknowledgment before the corresponding RTSP setup and RTSP play messages are sent by the client.

19. The apparatus of claim 17, wherein the server is a controller connected to a plurality of content servers.

20. The apparatus of claim 19, wherein the controller is operable to perform session management while the content servers transmit media data to the client device using RTP.

\* \* \* \* \*